United States Patent [19]

Stolarczyk

[11] 4,080,642
[45] Mar. 21, 1978

[54] POWER SYSTEM SAFETY MONITOR

[76] Inventor: Larry G. Stolarczyk, 612 S. 7th St., Raton, N. Mex. 87740

[21] Appl. No.: 762,671

[22] Filed: Jan. 26, 1977

[51] Int. Cl.² ............................................. H02H 3/16
[52] U.S. Cl. ........................................ 361/47; 361/87
[58] Field of Search ....................... 361/47, 48, 49, 50, 361/87; 324/51; 340/256

[56] References Cited

U.S. PATENT DOCUMENTS

| | | | |
|---|---|---|---|
| 3,728,582 | 4/1973 | Agnew | 361/48 |
| 3,995,200 | 11/1976 | Stolarczyk | 361/48 |

*Primary Examiner*—J D Miller
*Assistant Examiner*—Patrick R. Salce
*Attorney, Agent, or Firm*—Boone, Schatzel, Hamrick & Knudsen

[57] ABSTRACT

An electrical power system safety monitor for monitoring the continuity of an electrical power distribution system and including signal generators for generating a monitoring signal and a simulated fault signal; an impedance bridge; a three-phase coupler connected between the impedance bridge and the system's three-phase electrical conductors for impedance coupling the bridge to the conductors; a second three-phase coupler connected between the three-phase electrical conductors and the ground connector for impedance coupling the three-phase electrical conductors to the ground conductor; a reactor in series with the ground conductor for impedance isolating the ground conductor; and a signal comparator for developing a control signal whenever the relationship between the simulated fault signal and the monitoring signal indicates the occurrence of an electrical fault in the system.

4 Claims, 4 Drawing Figures

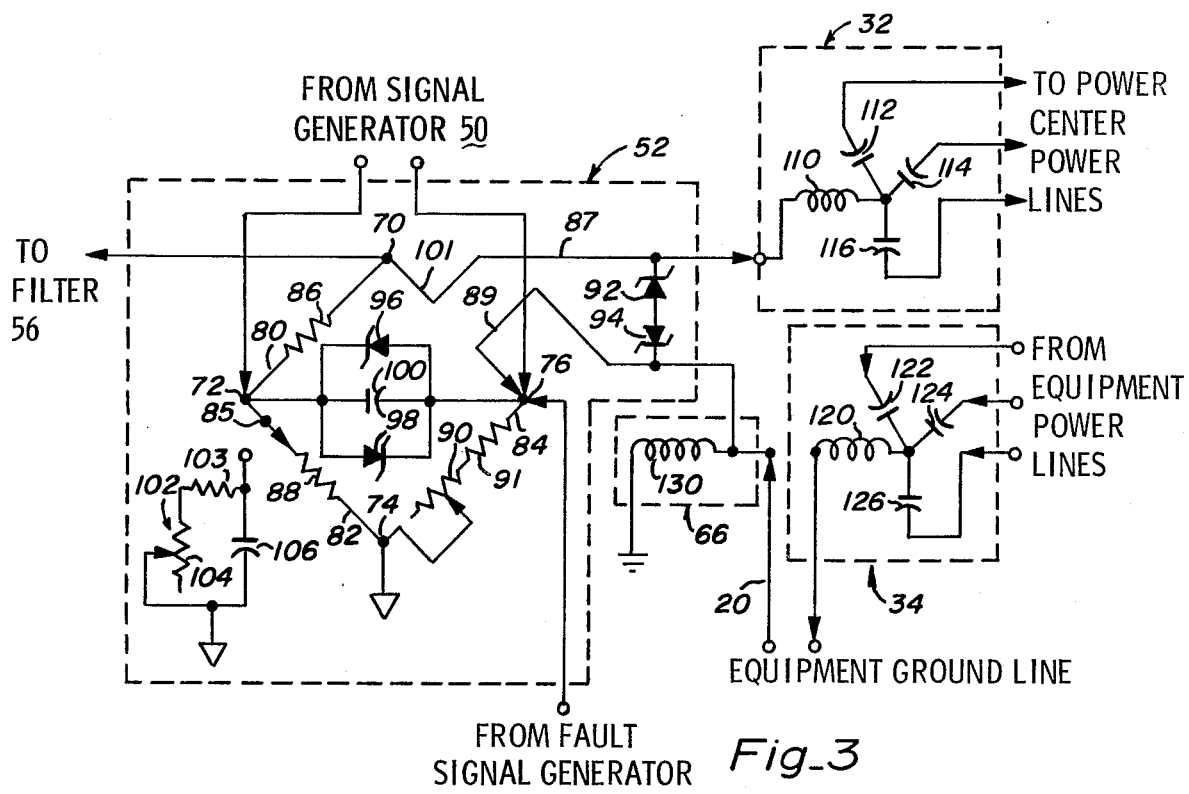
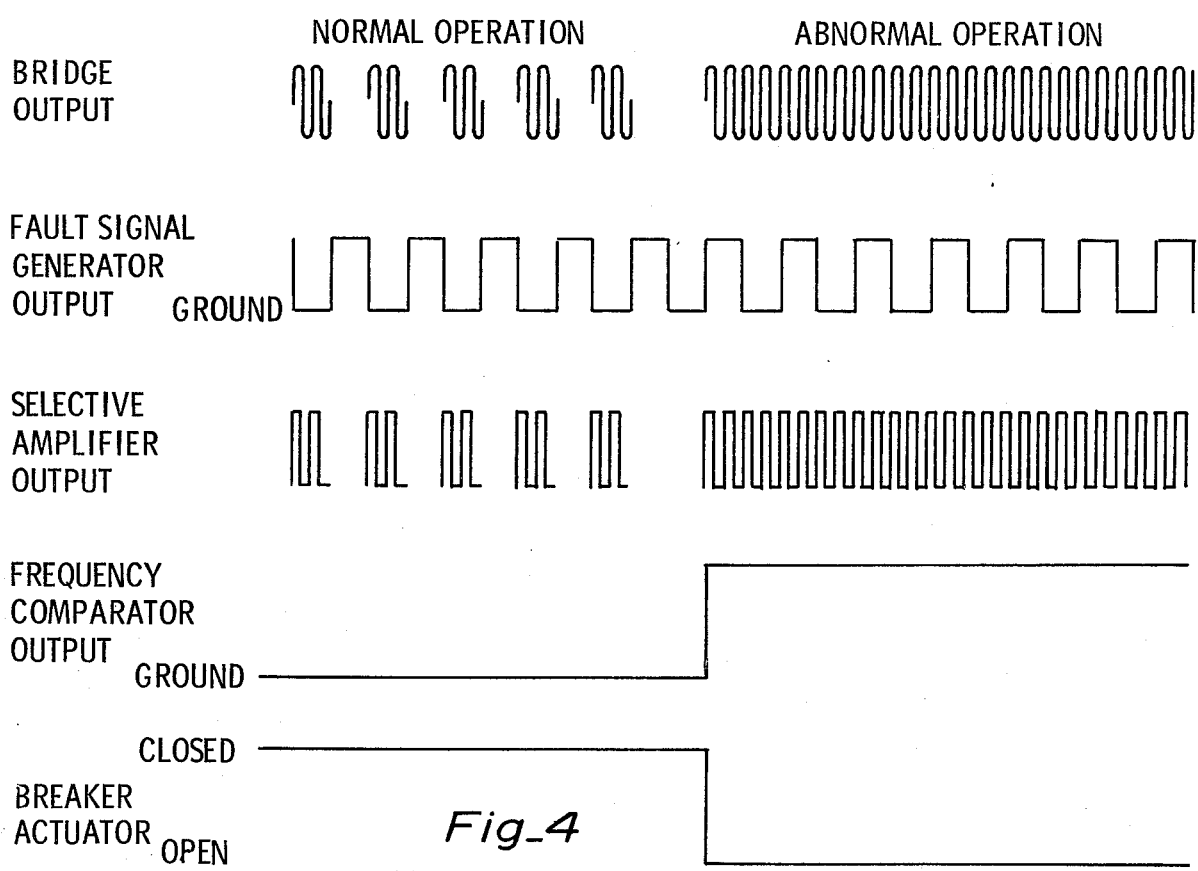

POWER SYSTEM SAFETY MONITOR

BACKGROUND OF THE INVENTION

1. Field of the Invention

The present invention relates generally to electrical safety equipment and, more particularly, to an improved power system safety monitor for detecting faults in electrical power systems and for generating a command signal to actuate the power system circuit breakers.

2. Description of the Prior Art

In electrical power systems used with mining and other electrical equipment, it is essential that the power lines and ground lines be constantly monitored to prevent electrical faults from occurring in the system. Sparks caused by an electrical fault may result in injury to nearby personnel, ignition of volatile gases, or other accidents. Such accidents may have catastrophic results to personnel and equipment, particularly in underground mines.

Electrical and electronic devices have been developed in the past in an effort to provide a detector for detecting faults in the power system and for deenergizing the system before a hazardous condition can develop. However, such devices typically require a pilot conductor, independent of the other conductors in the power system, which results in additional system complexity and additional cost. U.S. Pat. No. 3,995,200 is representative of prior art.

SUMMARY OF THE PRESENT INVENTION

It is therefore a primary object of the present invention to provide an improved electrical power system safety monitor which monitors both the power supply lines and the ground conductor.

It is another object of the present invention to provide an electrical power system safety monitor which does not require the use of an additional pilot or ground check conductor in the electrical system power cable.

Briefly, the present invention is directed to an electrical power system safety monitor which includes a DC power supply to supply power to the device, an impedance bridge for passing a monitoring signal whenever a bridge imbalance occurs, in response to a simulated fault signal, or in response to a fault in either the electrical power or ground conductors of the electrical system; a signal generator for generating the monitoring signal; a fault signal generator for generating the simulated fault signal which causes the bridge to become intermittently unbalanced and which is also used as a switching signal by a frequency comparator; a filter for removing spurious signals from the bridge output signal; a selective amplifier for converting the filtered bridge output signal into a true fault signal; a threshold detector for passing the true fault signal if its pulses exceed a predetermined threshold level; a flag latch for indicating a fault condition; a frequency comparator for developing a signal if the pulses of the simulated fault signal do not coincide with the pulses of the true fault signal; and a breaker actuator for developing a control signal to actuate the circuit breakers of the power system. The invention monitors both the electrical power conductors and the ground conductor of the power system to detect a change in their resistance or inductance indicating an open circuit or resistive fault. When a change or fault occurs, a control signal is developed by the safety monitor which causes the appropriate circuit breakers to cycle, thereby deenergizing the power system and isolating any dangerous equipment.

IN THE DRAWING

FIG. 3 is a schematic representation of a portion of the preferred embodiment of the present invention; and FIG. 4 is a series of waveforms illustrating the various electrical signals developed and used by the safety monitor during normal operation and during abnormal operation, i.e., when an electrical fault occurs.

DETAILED DESCRIPTION OF THE PREFERRED EMBODIMENT

Figure 1:
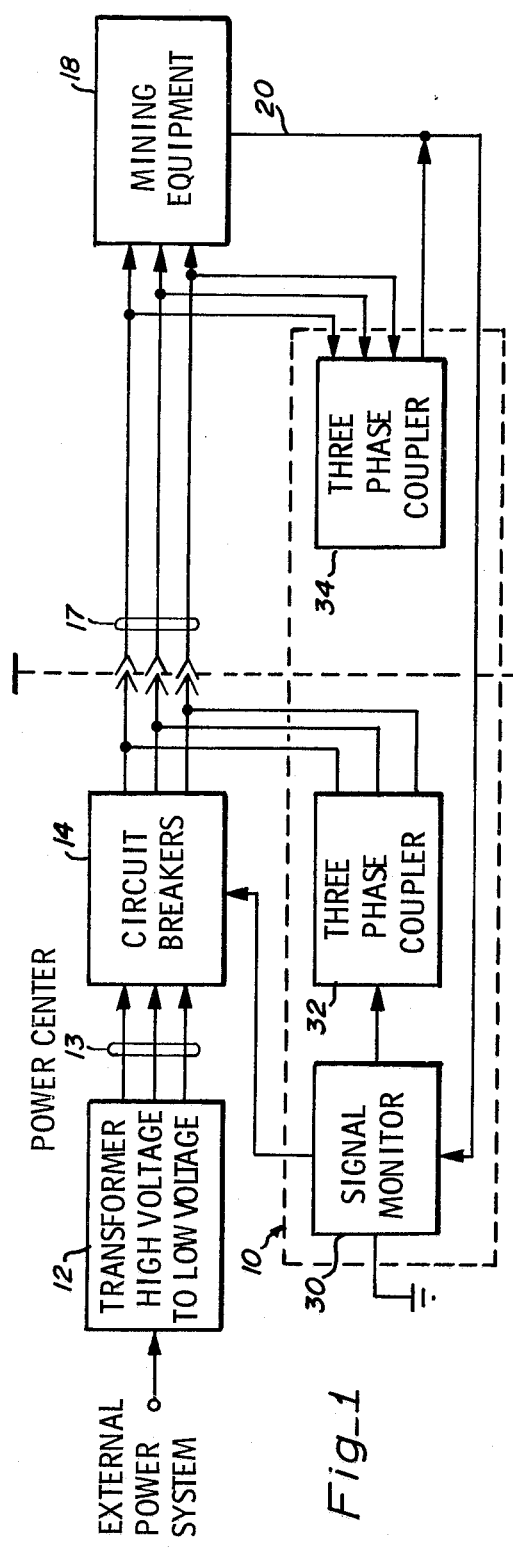
FIG. 1 is a block diagram illustrating the application of the present invention to an electrical power system of the type commonly used with undergound mining equipment.

Referring to FIG. 1 of the drawing, an electrical power system safety monitor 10 in accordance with a preferred embodiment of the present invention is shown as it is used in a power distribution system for underground mining equipment. As illustrated, an external power system provides high-voltage electrical power to a high-voltage-to-low-voltage transformer 12. Low voltage is output by transformer 12 on a set of three-phase conductors 13 which are connected to a set of circuit breakers 14. After passing through breakers 14, conductors 13 are connected to a set of three-phase conductors 17 which feed the mining equipment 18. A ground conductor 20 serves to ground the mining equipment.

Safety monitor 10 includes a signal monitor 30 for measuring the impedance of the power conductors and the ground circuit; a three-phase coupler 32 for impedance coupling the monitor 30 to the three-phase conductors 13 on the load side of circuit breaker 14; and a three-phase coupler 34 for completing the monitoring circuit to the ground line 20.

In operation, safety monitor 10 measures the series impedance of the circuit formed by the coupler 32, the three-phase conductor 17, coupler 34 and the ground conductor 20. Continuity exists throughout the three-phase system, and the system remains energized, as long as the system impedance of the monitored circuit remains at a defined value.

Figure 2:
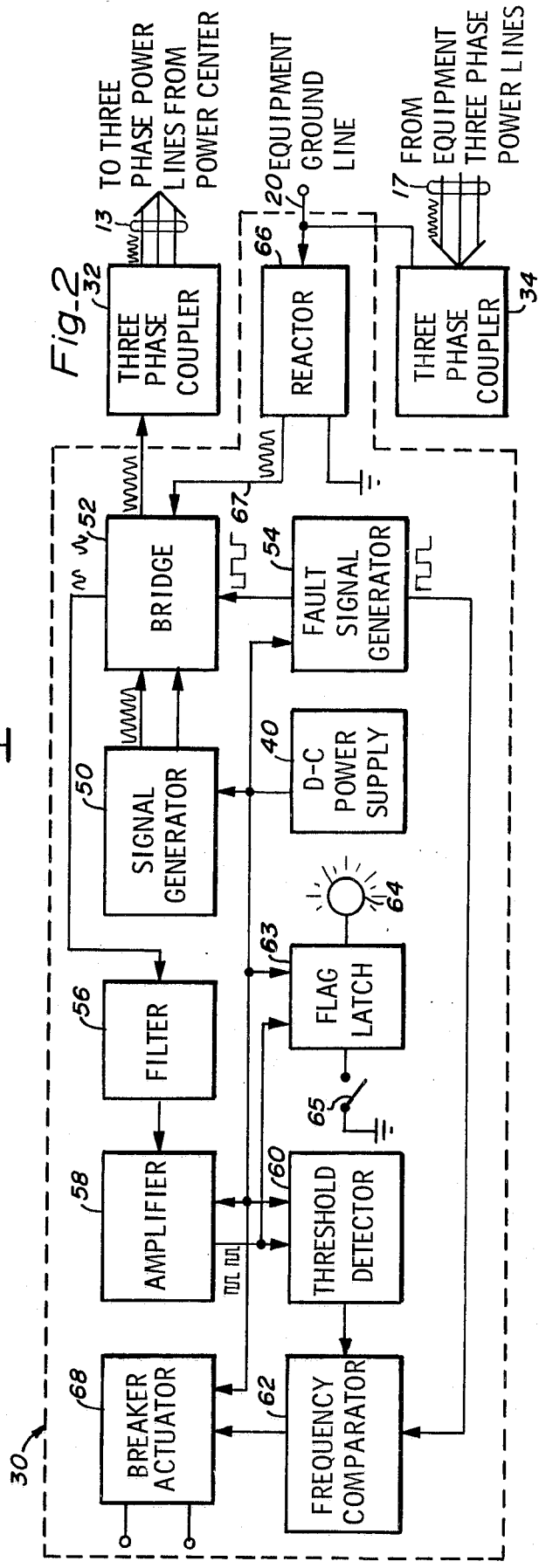
FIG. 2 is a block diagram illustrating a preferred embodiment of an electrical power system safety monitor in accordance with the present invention.

FIG. 2 illustrates, in block diagram form, an electrical power system safety monitor in accordance with the preferred embodiment of the present invention. The safety device includes three-phase coupler 32; three-phase coupler 34; a DC power supply 40; a monitoring signal generator 50; an impedance bridge 52; a fault signal generator 54; a filter 56, an amplifier 58; a threshold detector 60; a frequency comparator 62; a flag latch 63 having an indicator lamp 64 and a reset switch 65; a reactor 66; and a breaker actuator 68. Also shown in FIG. 2 are portions of three-phase conductors 13 and 17 and ground conductor 20.

Signal generator 50 may be a sinusoidal signal generator for generating a low voltage level signal. The signal is a fixed frequency signal with a frequency much higher than the frequency of the main power signal, e.g., 5 kHz. Thus, the signal is distinct from the main power signal frequency and spurious signals which may be present in the power system.

The DC power supply 40 is a full-wave, bridge rectifier circuit which develops a 9-volt DC output from a 12-volt AC input. The DC power supply provides DC power to the signal generator 50, fault signal generator 54, amplifier 58, threshold detector 60, flag latch 63 and breaker actuator 68.

Impedance bridge 52 may be in the form of a Wheatstone bridge or a Maxwell bridge, as will be described below. The Wheatstone configuration may be used for short distance power transmission applications where the transmission line impedance is substantially resistive. The Maxwell configuration should be used for long distance power transmission applictions where there is significant inductive reactance. Bridge network 52 includes four legs (see FIG. 3) with three-phase conductor 17, ground conductor 20 and three-phase couplers 32 and 34 serving as one leg thereof. The monitoring signal from signal generator 50 is applied across two legs of bridge 52.

Fault signal generator 54 includes an astable oscillator for developing a periodic output signal (simulated fault signal). This signal is also fed to the bridge 52 and causes one side of bridge 52 to become intermittently grounded.

The filter 56 may be any band pass filter suitable for filtering the monitoring signal generated by signal generator 50. The function of filter 56 is to eliminate signals other than those of the monitoring signal frequency to prevent spurious signals within the power system from activating the safety device.

The amplifier 58 is designed to amplify signals having the same frequency as the monitoring signal generated by signal generator 50. Amplifier 58 is biased so that monitoring signals output from bridge 52 drive amplifier 58 into saturation resulting in a clipped squarewave-type signal output.

The squarewave-type signals from amplifier 58 are input to the threshold detector 60 which compares the voltage level of the pulses from amplifier 58 to a predetermined voltage level. If the voltage level of the signals from amplifier 58 exceed a predetermined level, indicating a valid signal, an output signal is developed.

The output signal from the threshold detector 60 is fed into frequency comparator 62 which also receives a simulated fault signal from fault signal generator 54. If pulse signals from the threshold detector 60 occur in the absence of a fault signal, frequency comparator 62 develops an output signal which causes breaker actuator 68 to generate a control signal. The control signal causes the automatic circuit breakers 14 (of FIG. 1) to throw, thus deenergizing the system. To improve the reliability of the power system safety monitor, a dual-circuit frequency comparator 62 may be used, having provisions for switching between the two circuits.

Breaker actuator 68 may be a mechanical relay or any other suitable switching device which can switch an actuating signal appropriate to operate circuit breaker 14. So long as the signal from frequency comparator 62 is of the proper form, indicating normal operation of the power system, actuator 68 remains in an energized state. Whenever the signal from comparator 62 indicates that a fault has occurred anywhere in the electrical power system being monitored, actuator 68 changes state causing a signal to be sent to circuit breakers 14 which in turn results in their cycling.

After a fault occurs in the system, the flag latch 63 turns lamp 64 on, indicating that the breaker actuator 68 has operated. The flag lamp 64 stays on until manually reset. The visual indication from flag 63 helps detect intermittent open or short circuits in the ground system that may occur while the power cable is being handled.

In operation, the bridge 52 is balanced to the impedance in the unknown leg which consists of the circuit to be monitored. Here, that circuit includes three-phase coupler 32, power conductor 17, ground line 20 and three-phase coupler 34. So long as that impedance remains constant, the output from bridge 52 is determined by the simulated fault signal. If the impedance of that circuit changes, a continuous bridge imbalance occurs which results in deenergizing of the electrical power system as previously described.

Referring now to FIG. 3, a partial schematic representation of an electrical power system safety monitor in accordance with the present invention is illustrated. As shown, bridge 52 includes four terminals 70, 72, 74 and 76 at the juncture of legs 101–80, 80–82, 82–84 and 84–101, respectively, and a switch 85 in leg 82. Resistive elements 86, 88, and 90 and 91 are within legs 80, 82 and 84, respectively. Leg 101 includes a pair of lines 87 and 89 connected to terminals 70 and 76. Leg 101 also includes a pair of back-to-back high power transient protection zener diodes 92 and 94. Between terminals 72 and 76 are a pair of oppositely directed zener diodes 96 and 98 connected in parallel with a capacitor 100. A Maxwell configuration sub circuit 102 is also provided having a resistor 103, an adjustable resistor 104, and a capacitor 106.

Resistive element 90 is a rheostat or other adjustable device to allow bridge 52 to be balanced resistively to the electrical power system being monitored. However, resistor 91 prevents balancing if the system is in a fault condition. If the power system itself has significant inductive impedance, as in a system having long-distance lines, Maxwell configuration sub circuit 102 is placed in the bridge circuit, and resistive element 88 is removed by switching switch 85. The effective impedance of configuration 102 may be adjusted by resistor 104 and resistor 90. Resistor 90 is also used in this configuration to match the resistance of the power system conductors. Resistor 103 prevents bridge 52 from being nulled if the real part of the system impedance increases above 75 ohms. Since the Maxwell bridge is used for detection rather than measurement, it is important to select the Maxwell bridge element valves such that the voltage change at node 70 is a maximum for a given change in either the resistance or inductance of the ground circuit.

Any high transient voltage developed in the power system will appear across resistive element 86 of bridge 52 because of the conductive relationship between diodes 96 and 98, and capacitor 100. To prevent damage to resistive element 86, diodes 92 and 94 serve as spark arrestors by preventing a voltage difference to develop between terminals 70 and 76 greater than the zener voltage plus one diode junction voltage.

Additionally, diodes 96 and 98, and capacitor 100 prevent high-voltage transients from reaching signal generator 50, which could result in damage to generator 50.

The monitoring signal from generator 50 is imposed upon terminals 72 and 76 of bridge 52 while the signal from fault signal generator 54 is imposed on terminal 76. Each time the simulated fault signal from fault signal generator 54 goes low, grounding terminal 76, the monitoring signal from signal generator 54 is caused to be output by bridge 52 to the filter 56.

Also shown in FIG. 3 are three-phase couplers 32 and 34. Coupler 32 includes an inductor 110 and capacitors 112, 114 and 116. As described above, couplers 32 and 34 allow power conductors 13 and 17, and ground conductor 20 to become one leg of bridge 52. Coupler 34 includes an inductor 120, and capacitors 122, 124 and 126. Coupler 34 is attached at the line end of three-phase power conductors 17, proximate the mining equipment 18, and provides an impedance connection between conductors 17 and ground conductor 20.

Reactor 66 is an inductor 130 with an air gap of 0.010 inch or greater to prevent saturation of the inductor core with moderately high monitoring signals. Typically, the inductor 130 may be of a value of 2.5 mH in the monitoring circuit, resulting in a reactance of 78.54 ohms or greater for a 5000 Hz signal. Thus, the ground line 20 is isolated for impedance measurements taken at higher frequencies.

FIG. 4 illustrates waveforms of several signals which are output by components of the power system safety monitor in accordance with the preferred embodiment of the present invention. Signals are illustrated for two modes of operation, normal operation and abnormal operation. Abnormal operation is that condition following the occurrence of an electrical fault in either the electrical power conductor 17 or in the ground conductor 20.

The output of bridge 52 is controlled, during normal operation, by the simulated fault signal from fault signal generator 54 and includes a series of bursts of a high frequency signal. (The high frequency signal is that signal generated by test signal generator 50, and may be approximately 5 kHz.)

During normal operation selective amplifier 58 clips the bridge output signal causing a series of high frequency squarewavetype signal bursts. These bursts are fed into frequency comparator 62 which, during normal operation, has a zero or ground level output. The ground level output of frequency comparator 62 causes breaker actuator 68 to be energized, closing the relays or other switching means within actuator 68.

When an abnormal condition occurs, the bridge 52 output becomes a steady, high frequency signal regardless of the signal from fault signal generator 54. Selective amplifier 58 transforms this high frequency signal into a now continuous train of short duration squarewaves. Frequency comparator 62 receives these squarewaves from amplifier 58, which are now of such a continuous nature that comparator 62 changes state from a ground level to a breaker actuating voltage level. When comparator 62 changes state, breaker actuator 68 is deenergized. The internal switching mechanism of actuator 68 opens which in turn causes circuit breakers 14 (see FIG. 1) to cycle, thus deenergizing the mining equipment 18 and preventing any electrical shorts or other hazardous conditions from developing.

While the invention has been particularly shown and described with reference to a particular preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. In an electrical power distribution system including a main power source for providing electrical power, a set of power conductors for transferring the electrical power from the main power source to electrical equipment, the power conductors including a set of circuit breakers for deenergizing the electrical equipment if an electrical fault occurs in the system, a ground conductor for grounding the electrical equipment, and an electrical power system safety monitor for monitoring the continuity of the power conductors and the ground conductor and for developing a control signal which causes the circuit breakers to deenergize the system when an electrical fault occurs, an improved electrical power system safety monitor comprising:

first signal generating means for generating a simulated fault signal having a first series of pulses;

second signal generating means for generating a monitoring signal;

impedance bridge means having a first input connected to said first signal generating means and said second signal generating means, a second input also connected to said second signal generating means, and an output;

first coupler means for impedance coupling said impedance bridge to the power conductors of the distribution system at a point proximate their connection to the main power source of said system;

second coupler means connected between said power conductors and the ground conductor at points proximate their connection to the electrical equipment and operative to impedance couple said power conductors to said ground conductor;

reactor means forming a part of said ground conductor and being located at a point remove from said electrical equipment the end of said reactor connected to said electrical equipment also being connected to said impedance bridge, said reactor means having a relatively high impedance at the frequency of said monitoring signal and a relatively low impedance at the frequency of the electrical power; and signal comparator means having a third input for receiving said simulated fault signal and a fourth input conncted to said impedance bridge output, said signal comparator means being operative to develop a control signal whenever said monitoring signal does not occur time coincident with said simulated fault signal.

2. In an electrical power distribution system as recited in claim 1 wherein said signal comparator means includes:

filter means connected to said output of said impedance bridge means for filtering said monitoring signal;

amplifier means connected to said filter means, said amplifier means being responsive to the filtered monitoring signal and operative to develop a true fault signal having a second series of pulses;

frequency comparator means for comparing said first series of pulses of said simulated fault signal to said second series of pulses of said true fault signal and for developing an actuator signal if said first series of pulses are not time coincident with said second series of pulses; and breaker actuator means responsive to said actuator signal and operative to develop said control signal.

3. An electrical power system safety monitor for monitoring the continuity of three-phase power conductors which supply electrical power from a main power source to electrical equipment, and for monitoring the continuity of a ground connector which is connected between the electrical equipment and an appropriate ground point, comprising:
- a monitoring signal generator for generating a fixed frequency oscillating signal;
- a fault signal generator for generating a simulated fault signal having a first series of pulses;
- impedance bridge means having first and second inputs for receiving said fixed frequency oscillating signal, said second input also for receiving said simulated fault signal, said impedance bridge means also having an output;
- first coupler means connected between said impedance bridge means and the power conductors for impedance coupling said impedance bridge means to said power conductors, said first coupler being connected to said power conductors proximate the main power center;
- second coupler means connected between said power conductor means and the ground conductor at points proximate their connection to the electrical equipment and operative to impedance couple said power conductors to said ground conductor;
- reactor means forming a part of said ground conductor and being located at a point remove from said electrical equipment, the end of said reactor connected to said electrical equipment also being connected to said impedance bridge, said reactor means having a relatively high impedance at the frequency of said monitoring signal and a relatively low impedance at the frequency of the electrical power; and
- signal comparator means responsive to said simulated fault signal and responsive to said bridge output and operative to develop a control signal for deenergizing the system whenever said simulated fault signal and said bridge output are not time coincident.

4. An electrical power system safety monitor as recited in claim 3 wherein said signal comparator means includes:
- filter means connected to said output of said impedance bridge means for filtering said monitoring signal;
- amplifier means connected to said filter means, said amplifier means being responsive to the filtered monitoring signal and operative to develop a true fault signal having a second series of pulses;
- frequency comparator means for comparing said first series of pulses of said simulated fault signal to said second series of pulses of said true fault signal and for developing an actuator signal if said first series of pulses are not time coincident with said second series of pulses; and
- breaker actuator means responsive to said actuator signal and operative to develop said control signal.

* * * * *